United States Patent

Ho

[19]

[11] Patent Number: 5,301,634
[45] Date of Patent: Apr. 12, 1994

[54] ANIMAL FEEDER HAVING A MOUNTING DEVICE

[76] Inventor: Ying-Kuan Ho, 22, Nung 18, Lane 75, An Ping Road, Tainan, Taiwan

[21] Appl. No.: 18,880

[22] Filed: Feb. 17, 1993

[51] Int. Cl.$^5$ .............................................. A01K 39/02
[52] U.S. Cl. .................................... 119/18; 119/51.03; 119/72.5; 248/311.3
[58] Field of Search ............... 119/18, 51.03, 72, 72.5; 248/103, 214, 215, 311.3, 313

[56] References Cited

U.S. PATENT DOCUMENTS

| | | | |
|---|---|---|---|
| 1,966,648 | 7/1934 | Ryberg | 248/313 |
| 2,391,264 | 12/1945 | Nickelson | 248/103 |
| 2,936,992 | 5/1960 | Browning | 248/313 |
| 3,397,676 | 8/1968 | Barney | 119/18 |
| 3,645,234 | 2/1972 | Schroer | 119/18 |
| 4,005,844 | 2/1977 | Richmond | 248/313 |
| 4,807,567 | 2/1989 | Atchley | 119/18 |

*Primary Examiner*—Gene Mancene
*Assistant Examiner*—Todd E. Manahan

[57] ABSTRACT

A mounting device secures an animal feeder to a horizontal wire member of an animal house and includes a board, a pair of flaps extended from the board for engagement with the horizontal wire member, a pair of ears extended rearward from the board, and an elastic belt having two ends engaged with the ears so as to clamping the animal feeder to the board. The animal feeder is solidly secured to the board, and the board is secured to the animal house.

4 Claims, 3 Drawing Sheets

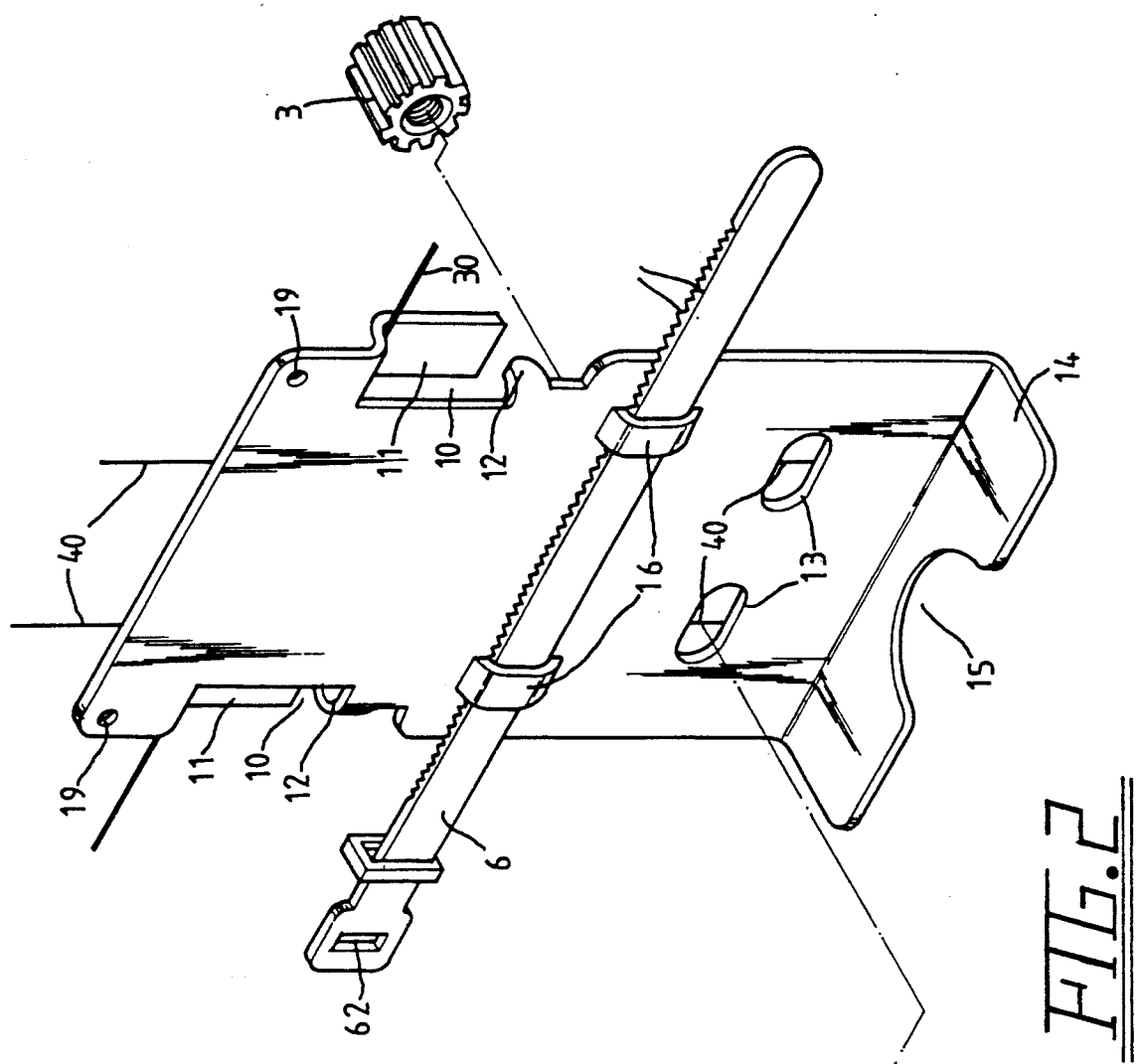
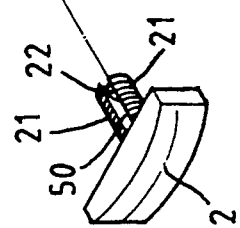
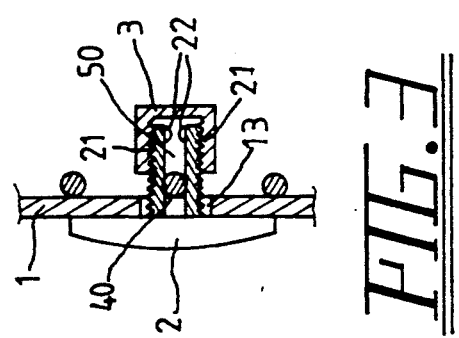

ANIMAL FEEDER HAVING A MOUNTING DEVICE

BACKGROUND OF THE INVENTION (a) Field of the Invention

The present invention relates to a mounting device, and more particularly to a mounting device for animal feeders.

(b) Description of the Prior Art

Typical animal feeders are disposed in the animal houses or fixed on the wall of the houses by bolts, however, normally, the animal feeders can not be easily attached to the walls.

The present invention has arisen to mitigate and/or obviate the afore-described disadvantages of the conventional mounting devices for animal feeders.

SUMMARY OF THE INVENTION

The primary objective of the present invention is to provide a mounting device with which the animal feeders can be easily mounted to the wall.

In accordance with one aspect of the present invention, there is provided a mounting device for mounting an animal feeder to a horizontal wire member of an animal house comprising a board including a pair of flaps extended rearward and downward therefrom for engagement with the horizontal wire member of the animal house, a pair of ears extended rearward from the board, and an elastic belt including two ends engaged with the ears so as to clamping the animal feeder to the board, whereby, the animal feeder is solidly secured to the board, and the board is secured to the animal house.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is an exploded view of the mounting device;

FIG. 3 is a cross sectional view illustrating the engagement of a bolt and nut.

DETAILED DESCRIPTION OF THE INVENTION

Figure 1:
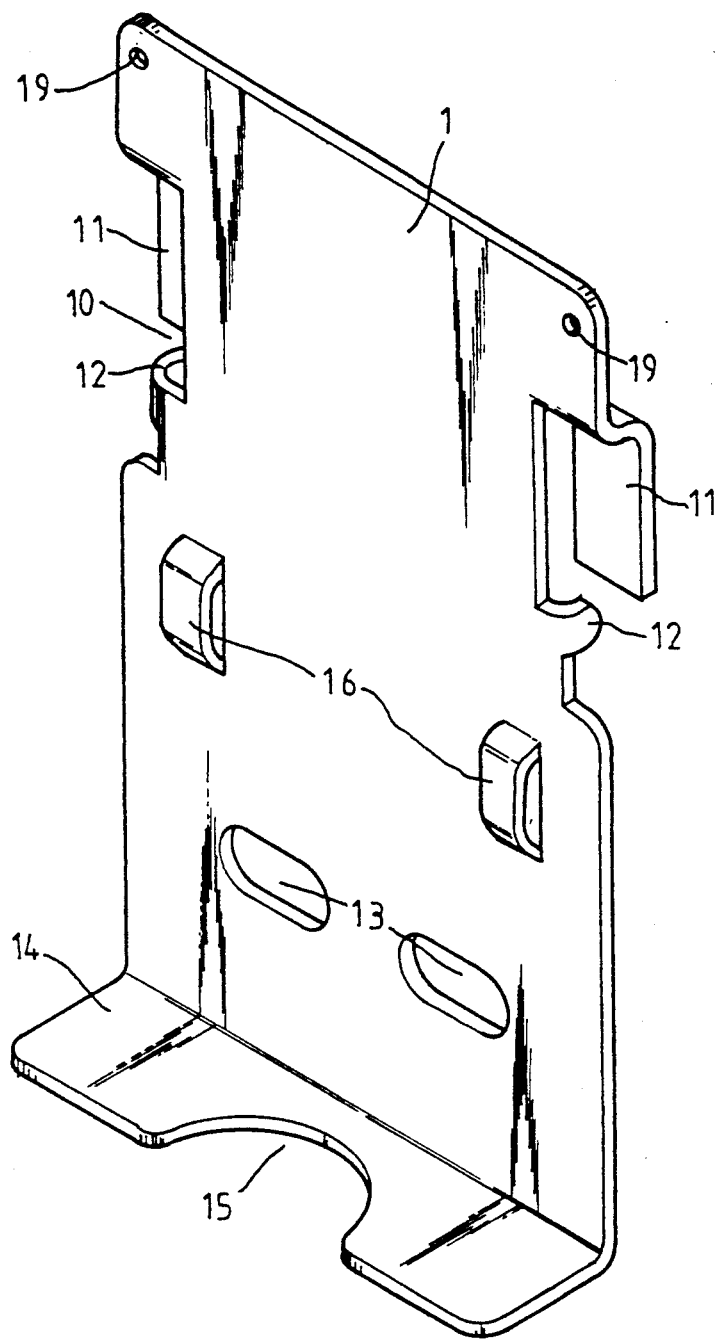
FIG. 1 is a perspective view of a main body of the mounting device for animal feeders in accordance with the present invention.

Referring to the drawings and initially to FIGS. 1 to 3, a mounting device in accordance with the present invention is provided for mounting an animal feeding apparatus to a wire member of an animal house and comprises generally a board 1 including a pair of flaps 11 extended rearward and downward therefrom such that a gap 10 is formed between the flaps 11 and the board 1 for engagement with a horizontal wire member 30 of an animal house (not shown) and such that the board 1 can be attached to the animal house, a pair of ears 12 extended rearward from the board 1 and located below the flaps 11 respectively, a pair of oblong holes 13 formed in the lower portion of the board and aligned with two vertical wires 40 respectively, a flange 14 extended forward from the bottom of the board 1 and having a notch 15 formed therein, and a pair of loops 16 formed in the middle portion of the board 1 for engagement with a strap 6, and two holes 19 formed in the upper portion of the board 1.

A fixing device 2 includes a head having a two-part bolt 21 extended therefrom and engaged in each of the oblong holes 13, a groove 50 formed in each of the two-part bolts 21 for receiving the vertical wire members 40, and a pair of protrusions 22 oppositely formed in the free end of each of the two-part bolts 21 for preventing the bolts 21 from disengaging from the vertical wire members 40, and a nut 3 threadedly engaged on each of the two-part bolts 21 for fixing the board 1 to the wire members 40.

Figure 4:
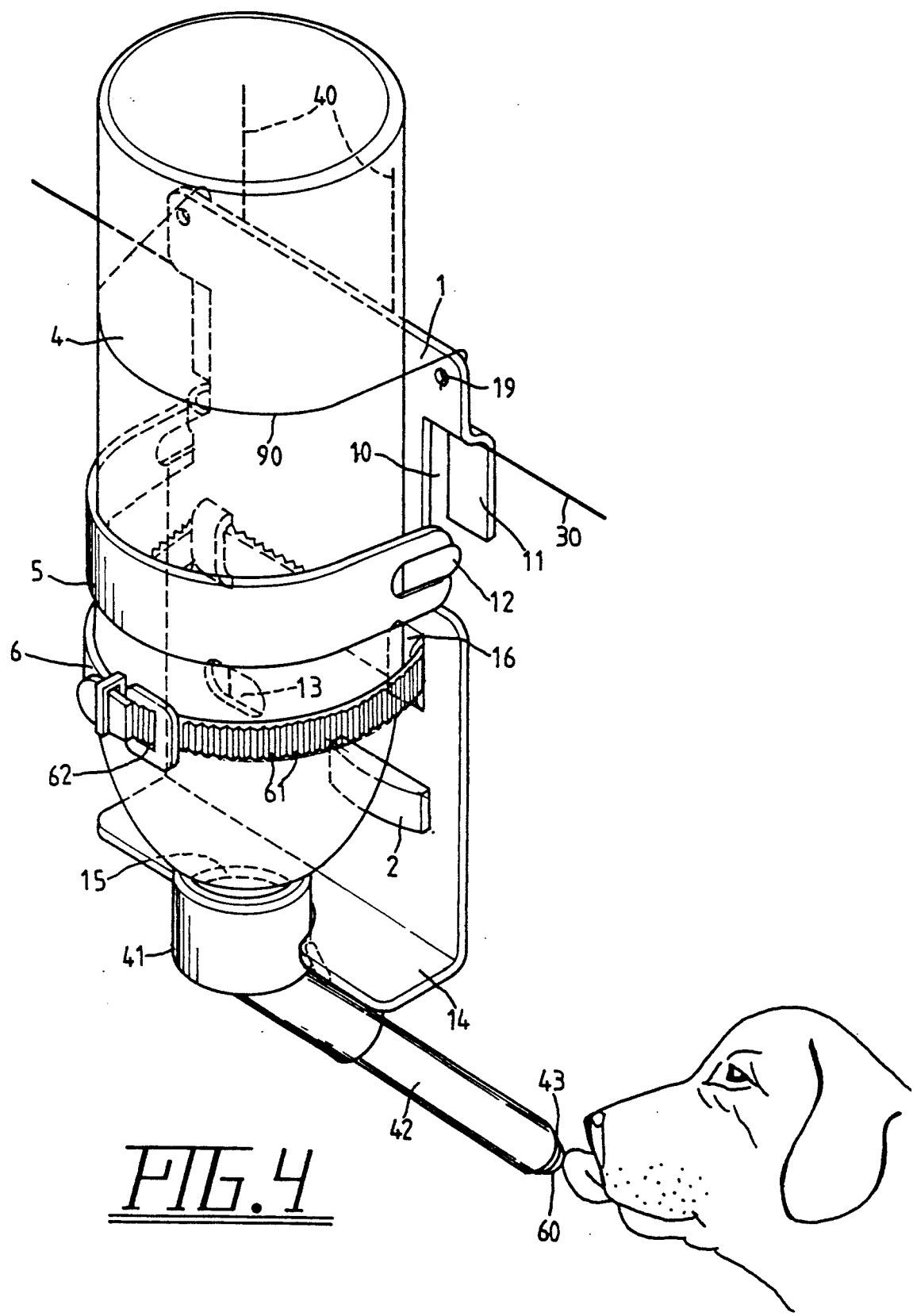
FIG. 4 is a perspective view illustrating the application of the present invention.

As shown in FIG. 4, the strap 6 includes a ring 62 formed on one end and a plurality of teeth 61 formed thereon for engaging with said ring and for securing a bottle 4 of an animal feeder to the board 1, the animal feeder 4 includes a cap 41 engaged in the notch 15 of the flange 14 and an extension 42 extended from the cap 41, a mouth 43 formed in the free end portion of the extension 42 and a ball 60 disposed in the mouth 43, the animal feeder 4 is commercially available and will not be described in further details. An elastic belt 5 has two ends engaged with the ears 12 for further clamping the bottle 4 to the board 1. A wire 90 includes two ends engaged in the holes 19 respectively for further fixing the bottle 4 to the board 1.

Accordingly, the mounting device in accordance with the present invention can be easily mounted to the mesh type animal houses, and the animal feeders can be solidly secured to the board of the mounting device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An animal feeder comprising a mounting device for mounting said animal feeder to a horizontal wire member of an animal house, said mounting device comprising a board including a pair of flaps extended rearward and downward therefrom for engagement with said horizontal wire member of said animal house, a pair of ears extended rearward from said board, and an elastic belt including two ends engaged with said ears for clamping said animal feeder to said board, said board including one oblong hole for aligning with a vertical wire member of said animal house, a bolt having a groove formed therein for engagement with said vertical wire member and a nut threadedly engaged with said bolt for further fixing said board to said animal house.

2. A mounting device according to claim 1, wherein said bolt includes a pair of protrusions oppositely formed in said groove of said bolt for preventing said bolt from disengaging from said vertical wire member.

3. A mounting device according to claim 1, wherein said board includes a pair of loops formed thereon, a strap engaged with said loops and having a ring formed on one end and a plurality of teeth formed thereon for engaging with said ring and for clamping said animal feeder to said board.

4. A mounting device according to claim 1, wherein said board includes two holes formed in the upper portion, and said mounting device further includes a wire having two ends engaged with said holes so as to further secure said animal feeder to said board.

* * * * *